R. H. TYLER.
INDEXED BOOK.
APPLICATION FILED JUNE 24, 1911.
1,084,981.
Patented Jan. 20, 1914.
2 SHEETS—SHEET 1.
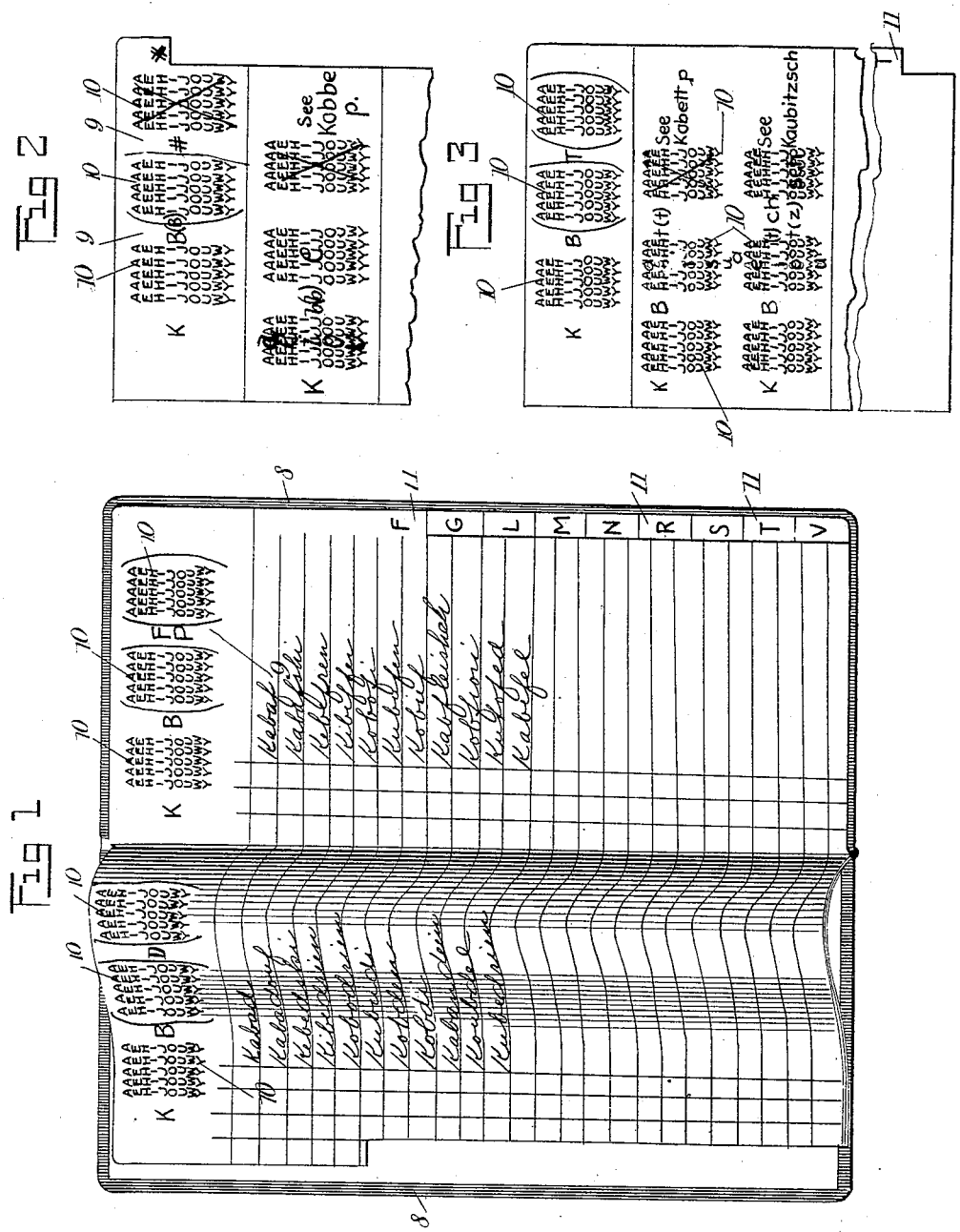
WITNESSES
Sidney Brooks
INVENTOR
Robert H. Tyler
BY Munn & Co.
ATTORNEYS

R. H. TYLER.
INDEXED BOOK.
APPLICATION FILED JUNE 24, 1911.

1,084,981.

Patented Jan. 20, 1914.

2 SHEETS—SHEET 2.

Fig. 4

WITNESSES

INVENTOR
Robert H. Tyler
BY
ATTORNEYS

UNITED STATES PATENT OFFICE.

ROBERT HALL TYLER, OF NEW YORK, N. Y.

INDEXED BOOK.

1,084,981. Specification of Letters Patent. Patented Jan. 20, 1914.

Application filed June 24, 1911. Serial No. 635,132.

*To all whom it may concern:*

Be it known that I, ROBERT H. TYLER, a citizen of the United States, and a resident of the city of New York, borough of Manhattan, in the county and State of New York, have invented a new and Improved Indexed Book, of which the following is a full, clear, and exact description.

Among the principal objects which the present invention has in view are: to provide a book indexed by employing syllabic or phonetic keys or guides; in employing conjunctively with the said keys groups of letters having the vowel sounds; and in employing designating marginal indices to be used in conjunction with each of the keys.

The system is peculiarly adapted for employment in connection with the indexing of real estate titles, and in this connection it is shown in the drawings.

One embodiment of the present invention is disclosed in the structure illustrated in the accompanying drawings, in which like characters of reference denote corresponding parts in all the views, and in which—

Figure 1 is a view of adjoining sheets of an index book arranged for indexing in accordance with the present system; Fig. 2 is a view of a fragment of a sheet similarly arranged, showing a method of use of the vowel groupings differing from that disclosed in Fig. 1; Fig. 3 is a view of a fragment of a sheet having applied thereto vowel groupings varying from those shown in the previous figures; and Fig. 4 is a diagrammatic arrangement to illustrate the method of using the system herein described.

The present system is based upon the fact that names having the same sound are variously spelled, the variation being due in large measure to evolution, ignorance or national characteristics. It is necessary to facilitate the work of searching titles, judgments, and similar information, that the tabulation of the names should be arranged in order to avoid the mistakes due to lack of knowledge of the variety of methods employed for spelling the name. In the present system I have adopted for each letter of the alphabet, and for every stem thereof, combinations with an index of one vowel and twelve consonant sections. By arranging the vowel groups in columns of five a range is thereby presented for quickly denoting the extent of the use of any particular vowel, or all vowels, or variations thereof which may occur in the spelling of any particular name. I have elected to place three such groups transversely across a sheet as a heading for a section, the groupings being spaced apart to provide two interspaces and two lateral spaces, being four spaces in all. The spaces, lateral and inter, are provided to receive the dominant consonants of the names, or as in the case of names beginning with a vowel the consonants of the second and following syllables. Each vowel group is provided for a syllable of the name. If the name have more than three syllables this may be provided for by augmenting the number of vowel groups employed.

As seen in the accompanying drawings, and particularly in Fig. 1 thereof, the book 8 is employed for what is known in this system as the "K—B" group, or in other words, the group of names the first two syllables whereof phonetically represent sounds having this characteristic. As an illustration, the name "Kobbe." The book is disclosed as opened to what may be termed the "D" and "F" sheets, on which sheets will be found the "K—B" names, the third syllable whereof begins in the one instance with the "D" sound and in the other instance with the "F" sound, this being understood phonetically; as for instance, the "ph" combination would produce the "f" sound, and therefore would be found on this sheet. It will be noted that on this sheet, in the third column 9 of the regular printed heading of vowel groupings, have been added the consonants "F" and "P." This provides for the fact that many names carry syllables having these two letters conjoined to produce the "F" sound. If the conjunction of the letters produce the "P" sound, the "F" being then silent, such names would be found in a sheet marginally indexed as "P," should such be required. Mention of this is here made to emphasize the fact that it is the phonetic rather than the alphabetical system which here controls.

In preparing the sheets for a book of this character they are each provided at the upper edge with the three vowel groups 10.

The books are arranged with marginally exposed indices 11 whereon are imprinted the letters initially dominating by sound the third syllable. These books, it will be understood, are each arranged by letter to an initial character. Thus the "K" in names would be assigned to a certain number of books in the general system, and the "K" books would then be arranged according to the combination of the "K" sound with the initial sound of the second syllable; as for instance, the "K—C" would be one book and the "K—B" a different book. Mention is made of this because the marginal indices would probably differ between books receiving the "K—B" and the "K—C" names. In the employment of an index thus provided various methods are followed, a few of which are disclosed in the drawings.

Referring to Fig. 1 of the drawings, and to the sheet represented in the left hand side of the book 8, in the second and third vowel groupings it will be noted that the groups are contained between parenthetical lines. This would indicate to the person employing the system that any or none of the vowels in the group succeeding the preceding consonant in the space between the groups or beside the groups could be employed. Where the groupings have been left without indicative markings there is thereby indicated that any of the vowels may be employed. Thus, the name indexed upon the sheet could be "Kabd" or "Kibedo." If desired to illustrate the number of vowels possible in the combination this may be done by erasing the vowels not used. This is particularly useful in names that have too voluminous a range and where used it is deemed advisable to cross reference. It will be noted that on the page at the right of the book shown in Fig. 1, in the third space, there have been placed the letters "F" "P." These have been spoken of above. A name thus suggested might be spelled "Koubjifo," or "Khibopfi," or "Kubepo." It will be noted that the characteristic sounds of the random selection here made are yet so similar that the searcher would know, in the first instance, that the name was a "K—B" name, and in the first illustration that the name was a "K—B—D" name and in the other instance that the name was a "K—B—(FP)" name.

In Fig. 2 of the drawings it will be noted that the page is provided with two sets of vowel groups, and that in each set the third group is crossed with an "X." This indicates that the name is confined to the two syllables, one beginning with the "K" sound employing any of the vowels of the succeeding group, and the second with the "B" sound employing any or none of the second vowel group. It will be noted in this connection that to the "B" has been added, in parentheses, a second "B," thereby indicating that the use of the second "B" is permitted for that name; as for instance, the name "Kobbe." On the same page it will be noted that in the first vowel group there have been written across the groupings, by hand, the vowels "A," "E," "I," "O" and "U." This is employed to signify that these vowels only are to be used, thereby eliminating the original vowel grouping. The same applies to the second grouping where the vowel "E" is superposed on the second grouping, indicating that the letter sound "E" is the only letter sound to be found in the name indicated. It will also be noted in the second set of groupings that the third vowel grouping is eliminated. As an index to this set see the marginal note reading "See Kobbe p." By this method the group is indicated as being confined to the name sounding "Kobbe." It will be understood, however, that again several spellings of a name may sound as "Kobbe;" as for instance "Kaubbie." Further samples of the same special utilization of the groupings are shown in Fig. 3, which it is not thought necessary to here elucidate.

In Fig. 4 of the drawings is shown a diagram where the interspaces between the vowel groupings 10, 10 are filled by vertical columns of the consonants used in connection therewith to form the consonant of the syllables with which the succeeding vowel group is employed. In arranging the heading of a page, or the combination groupings, any of the consonants in the first column of consonants, or group thereof, may be employed. This we will call the dominant key of the combination, for the reason that the second syllable of the word remains thereafter unchanged in the combination, while the consonant in the second column is constantly varied. To illustrate, taking the name "Kobbe" above employed, the letter "b" being used there, the first consonant column remains constant through "Kobbe," "Kobcay," "Kobday," or "Kobly." The consonant varying the third syllable, and shown in the second consonant column in the diagram, is thus varied, while the consonant in the first column of the diagram remains fixed.

Having thus described my invention, what I claim as new and desire to secure by Letters Patent is:—

An index book, comprising a plurality of sheets, all of said sheets having two letters imprinted thereon, the first of said letters being the initial letter, and the second of said letters being the first consonant succeeding the said initial letter, said first and second letters characterizing all the names grouped in said book, said sheets being arranged in groups and each sheet having imprinted thereon, groups of vowel letters, said groups being spaced apart to receive in serial order, the said first letter, said second letter and a third letter, said third letter being the second consonant succeeding the said initial letter and said third letter characterizing the sheets of each group.

In testimony whereof I have signed my name to this specification in the presence of two subscribing witnesses.

ROBERT HALL TYLER.

Witnesses:
FLORENCE M. ARNOLD,
EDWARD J. GAYNOR.

Copies of this patent may be obtained for five cents each, by addressing the "Commissioner of Patents, Washington, D. C."